Patented Apr. 3, 1928.

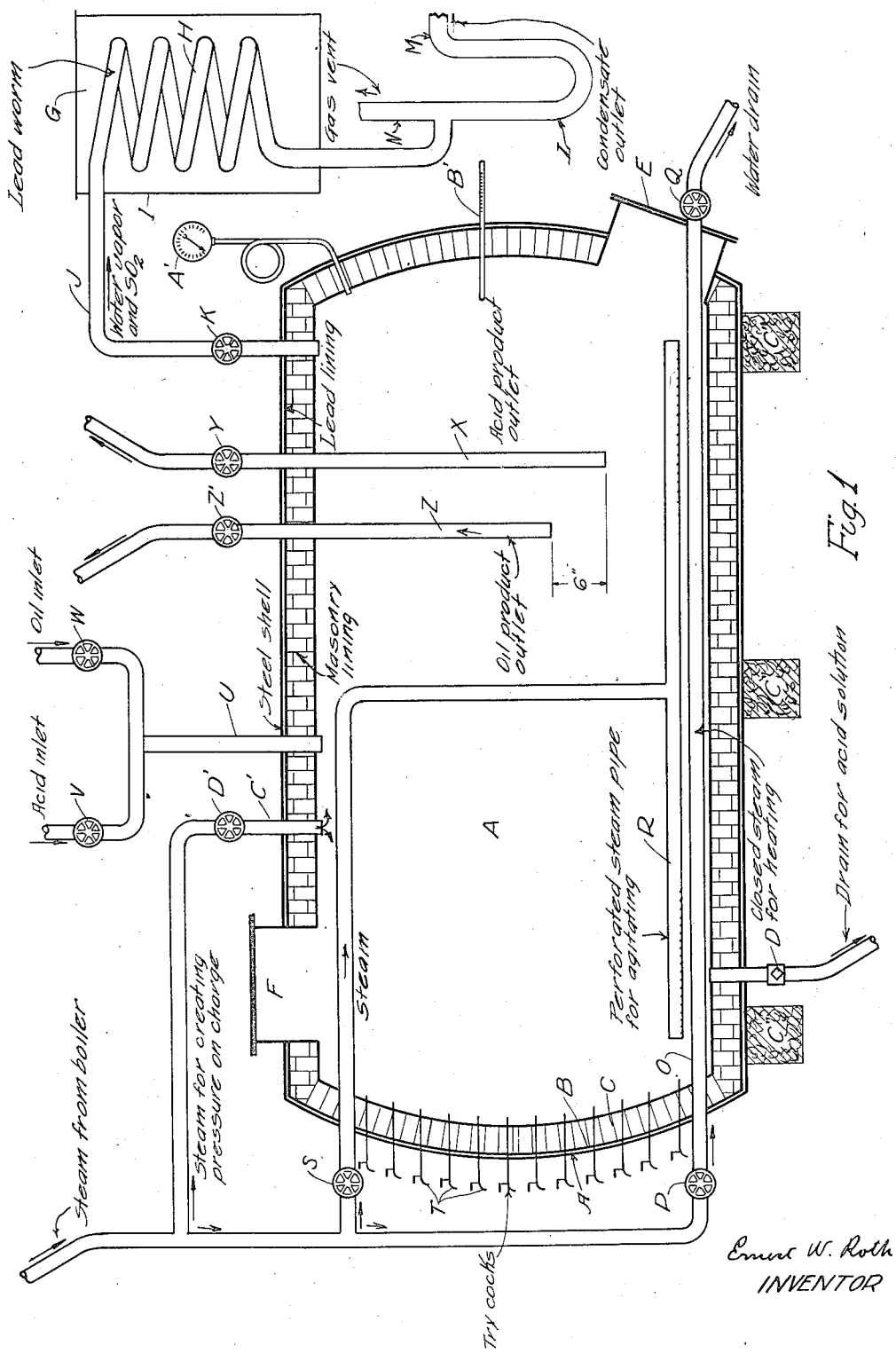

1,665,190

UNITED STATES PATENT OFFICE.

ERNEST W. ROTH, OF LOS ANGELES, CALIFORNIA, ASSIGNOR TO GENERAL PETROLEUM CORPORATION OF CALIFORNIA, OF LOS ANGELES, CALIFORNIA, A CORPORATION OF DELAWARE.

HYDROLYSIS OF ACID SLUDGE.

Application filed April 13, 1927. Serial No. 183,595.

In the refining of petroleum oils it is customary to treat various distillates and residues with sulfuric acid of different degrees of concentration, obtaining as products of such treatment a purified oil and a tarry product known in the trade as acid tar or acid sludge. This material, which is essentially a waste by-product of the refining process, varies in consistency from a rather fluid liquid to a solid pitch-like substance, but is usually a viscid and sticky semi-solid. The characteristics of the material vary with the kind of acid, the quantity of acid and the nature of the oil used in the treatment, but regardless of these variables the sludge consists essentially of free sulfuric acid, water, precipitated colloidal bitumens, and a group of products resulting from chemical reactions between the acid and certain constituents of the oil, these reaction products belonging to the general groups of alkyl and phenyl sulfuric acids and sulfonic acids. In other words, the acid reaction products which constitute a considerable proportion of the sludge consist of sulfuric and sulfurous acids combined with organic radicals, and these compounds, as is well known, may be broken down by the action of water or its vapor at suitable temperatures and pressures, both the acid and the original hydrocarbons from which the compounds were derived, or the polymers thereof, being thus reconstituted.

Four methods for separating sludge into more or less useful constituents have been proposed, these being briefly as follows:

A. The sludge is washed with cold water, by which the free sulfuric acid and the water-soluble bodies are recovered, the still acid tarry residue being suitable for fuel or other purposes after neutralization—only a small quantity of acid is thus regained.

B. The sludge is digested with boiling water, with or without the addition of a solvent oil, by which a partial hydrolysis is accomplished and a larger quantity of acid recovered, but the acid is highly contaminated with organic matter and of little value and the sludge is rendered only partly soluble in oil.

C. The sludge is hydrolyzed by water or its vapor under a steam pressure of about 100 pounds gauge and the temperature corresponding to such pressure, by which the sulfonic and other mixed acids are split with the recovery of substantially all the acid and the regeneration of all the hydrocarbons—this method being highly effective but slow and cumbersome, and having the disadvantages which will be hereafter pointed out.

D. The sludge is destructively distilled, either in a container or on a bed of burning fuel, the acid being reduced to sulfur dioxid and the carbonaceous elements burned. Each of these methods has its usefulness, but none of them except the last will handle in a satisfactory manner the heavy, pitchy sludges resulting from the treatment of asphalt base lubricating oils, and the last mentioned is rather a manner of disposing of a waste product than a process for recovering values.

My method invention is directed to the separation of the sludge into its original constituents as nearly as may be, with a minimum expenditure of time, fuel and labor, under the most favorable operating conditions, and in such manner as to secure the cleanest and purest final products and such as may be utilized to the greatest advantage. To this end I proceed, in brief, in the following manner:

I place in a lead lined digester (which is equipped with the various connections and accessories shown in the attached figure) a quantity of relatively strong sulfuric acid and a quantity of a solvent oil such as petroleum gas oil. The acid sludge is then added to the charge and should float on top of the acid layer. The preferred strength of acid and relative quantities of acid and solvent oil and the requirements as to the quality of the solvent oil will be hereinafter set forth in detail.

The acid is now heated to the boiling point and live steam is blown through the charge to bring about a gentle agitation, which is continued for only a short time. The agitation and heat, in the presence of water vapor and of solvent oil, brings about the following changes in the nature of the charge: the hydrolysis of the acid bodies by which the sulfuric acid is set free; the solution of the liberated sulfuric acid in the previously existing acid solution; the reconstitution of the hydrocarbons originally combined with acid in the sludge; the solution of such hydrocarbons in the gas oil; the solution of the asphaltic constituents of the sludge in the gas oil; the emulsification of the acid layer with the gas oil solution of hydrocarbons and asphalts.

The emulsion thus formed separates into three distinct layers: a bottom layer consisting of dilute sulfuric acid of about the same concentration as that originally placed in the digester, the quantity being increased; a slight intermediate layer of unbroken emulsion in which any carbon present in the original sludge will be held; an upper layer of a relatively thick black oil consisting of a solution of hydrocarbons and asphalt in the gas oil. This emulsion will settle spontaneously if the temperature is maintained at such point as to keep the oily constituents relatively mobile and if sufficient time be allowed, or the separation may be hastened by any of the well known means for breaking emulsions. We prefer, however, to break this emulsion in the following manner. All the vents from the digester are closed and the temperature is raised preferably to about 340° F., preferably by means of the steam coil. There being no vent the pressure will build up to somewhat less than the pressure corresponding to the gauge pressure of steam at the corresponding temperature, or say 90 to 100 pounds at the temperature stated. The steam to heating coil is then shut off. If the correct proportion of solvent oil has been used the emulsion will break instantly when the acid layer stops boiling. The completeness of the separation may be determined by drawing samples from the try-cocks shown in the figure. The acid solution is partially drawn off, and then the oily layer, leaving behind the intermediate layer and also sufficient acid to start the next batch. The entire operation may be completed within a few hours from the time the digester is charged.

Further objects of my invention and a preferred means and technique for putting it into practice will appear in the following description of an illustrative embodiment thereof, taken in connection with the appended claims and the accompanying drawings in which Figure 1 is a diagrammatic longitudinal section showing the digester and the various connections and accessories by means of which it is operated. A is the digester, which is preferably constructed of steel with domed heads capable of withstanding internal pressure up to at least 150 pounds per square inch. This digester should be lined with some acid resisting metal such as sheet lead, as indicated at B, and may if desired be lined inside the lead with acid resisting masonry as indicated at C. The digester may be supported on the concrete blocks C″—C″ or by other suitable means of support. It may be insulated if desired, though on account of the short time required for the treatment a heavy insulation is not required. The digester is provided with the drain-cock D which should be of acid resisting metal (this qualification applies to all the connections to this apparatus and need not be repeated) and with suitable manhole openings, as at E and F, for obtaining access to the interior of the apparatus. The cover of the manhole F may desirably be hinged and closed with a temper bar and screw (not shown) and may be used for the purpose of introducing thick or even solid sludge. G is a condenser of any of the well known forms but preferably consisting of a coil of lead pipe H immersed in water contained in the tank I. The usual means for supplying cold water to a condenser tank and for overflow of the heated water should be provided but are not shown. A connection J leads from the digester to the condenser and is provided with the valve K. The outlet end of the condenser is preferably equipped with the bent pipe trap L from which any liquid condensate overflows through the pipe M to a suitable tank (not shown) from which aqueous distillate may be withdrawn and wasted and in which any oil distilling over may be stored until it is withdrawn for use in succeeding operations or for any other purpose for which it may be suitable. Non-condensable gases passing through the condenser escape through the vent pipe N to the open air, or as these gases consist largely of sulfur dioxid and other irritating and malodorous substances they may preferably be carried to an absorber or any other of the well known means for disposing of gases of this character.

A steam coil O consisting of heavy pipe of acid proof material is placed on or near the bottom of the digester, admission of steam being controlled by the inlet valve P and drainage of condensed water by the outlet valve Q. The perforated pipe R should be placed close to the bottom of the digester for the admission of open steam thereinto, the steam supply to this pipe being controlled by the valve S. A number of try-cocks T—T are placed in any convenient location on either end or the side of the digester, and should be so spaced that the contents of the digester at any level may be accurately sampled. The spacing should not exceed six inches and is preferably considerably closer. An admission pipe U is used to conduct both diluted acid and gas oil into the digester, the inlet of acid being controlled by the cock V and of oil by the cock W, these liquids being brought in any convenient manner, by gravity or pumping, from any convenient sources of supply not shown. A pipe X reaching to a point relatively close to the bottom of the digester, is used to withdraw the excess quantity of dilute acid produced in the operation to any convenient place of use or disposal of such acid, the outflow being controlled by the cock Y. A similar pipe Z reaching only to a higher point in the digester is used for withdrawing the oily layer produced by the operation, the outflow of such oil being controlled by the valve Z'. The vertical distance between the lower ends of these two pipes should approximate 6''. It is obvious that the pipes X and Z might with equal facility be carried through the bottom or the sides of the digester instead of through the top.

A preferred manner of using this apparatus in the carrying out of my method invention is as follows:

A sufficient quantity of dilute acid is charged to the digester. This acid is preferably a recovered acid from a previous operation and is preferably left behind in withdrawing the products of a previous treatment. The gravity of the acid solution should preferably be about 30° Bé. (at normal temperature) though a somewhat weaker or stronger acid may be used. The acid must be heavy enough to float the sludge and keep it out of contact with the bottom of the digester which requires that it be say 20° Bé. or heavier, and on the other hand it must not be heavier than about 50° Bé. or the hydrolysis will not take place at atmospheric pressure. 30° Bé. is a preferred figure, and as the product from the operation is usually somewhat stronger it may if desired be brought back to this gravity by the addition of water.

The exact quantity of acid is immaterial so long as the digester contains a sufficiently deep layer to prevent the sludge from resting in the bottom of the digester when cold, since if the sludge has opportunity to lay hold of the metal, melting of the sludge will be much retarded and the entire course of the operation otherwise impaired, as will hereafter appear. As nothing is to be gained by economizing acid charge, a quantity equal to say one-third the volume of the total charge is preferable.

I next place in the digester a sufficient quantity of solvent oil. This oil is preferably the distillate from crude petroleum known as gas oil, having a gravity about 28/30° Bé. A similar distillate from cracked petroleum is even better, the solvent power being higher. A lighter product such as kerosene works as well, but is too expensive for commercial use, while heavier oils such as non-viscous neutrals require increased doses to secure the same rate of separation. The function of the solvent oil is to accelerate separation of the sludge by reducing the viscosity of the oil soluble constituents thereof, and therefore the more mobile the solvent oil the smaller will be the quantity required.

The quantity of solvent oil will vary with the nature of the sludge, very thick or solid sludges, containing high proportions of asphalt, requiring more solvent than such as consist mainly of sulfonic acids. A dose of say ten per cent of the volume of the sludge is suggested as an approximation, and the dose may be increased or decreased after observing the fluidity and rate of separation of the oily product of the operation. For digesting heavy lubricating sludges containing large proportions of asphalt much larger proportions of solvent oil may be used, up to three times the volume of sludge or even more. The general rule is that the viscosity of the final product should not be much above that of Bunker C fuel oil, or 300 seconds Furol at 122° F. It should be here stated that while the use of a solvent oil greatly facilitates the operation, its use is not necessary or essential, as good results may be obtained without it.

The acid should preferably be placed in the digester first, and the sludge must be added after the acid. It is immaterial at what point the solvent oil is added. The sludge may be fed in through the manhole F in any convenient manner, preferably direct from the agitators in which the oil is treated if the sludge is of such nature as to solidify on cooling. The quantity of sludge should be such that, when melted, the total charge including acid and solvent oil will fill the digester to not more than three-fourths its capacity. Some room has to be allowed for frothing, though when solvent oil is used as herein specified the frothing which otherwise takes place is much reduced.

The total charge being in place in the digester, the cover of manhole F is locked down and the valves V, X, Z', Y and S are closed, the valve K leading into the condenser is opened, and the steam valve P is opened sufficiently to heat the coil. The drain valve Q is also slightly opened to take care of the water condensing in the coil, and the charge is heated as rapidly as possible until the charge is entirely melted and the acid gently boiling, this bringing the temperature to about 230° F. if the acid is at 30° Bé. The steam valve S is then opened slightly, admitting a little steam to the perforated pipe R from which it passes up through the charge, producing gentle agitation of the mass. This agitation may if preferred be brought about by boiling the acid solution without using direct steam, and in either case is continued until no more sulfur dioxid is given off at the condenser outlet, from the pipe N. The cessation of gas evolution indicates that hydrolysis of the sludge is completed, and at this stage the charge should be completely emulsified and homogeneous and free from lumps or specks of unaltered sludge.

Any distillate condensed during the digestion stage of the operation runs out through the condenser tail pipe M into a suitable tank, not shown, from which the aqueous portion of the distillate is drawn to waste, while any oil collecting in the tank is from time to time transferred to the solvent oil supply tank to be again used. The gas passing out of the pipe N will consist of sulfur dioxid and other obnoxious gases, and may be disposed of by carrying it into a stack, or by absorption in alkali solution, or by any of the well known means for prevention of a nuisance.

At the end of the digestion period the charge will consist of acid in solution in water and of liberated hydrocarbons and asphalt in solution in gas oil, the whole thoroughly emulsified. The next step is to break this emulsion and separate the acid solution from the oil, and this separation will take place spontaneously if the digester is well insulated and the emulsion is allowed to rest for some hours. This separation, however, takes place slowly and ties up the apparatus for an undue time, and the ordinary method of breaking emulsions, as by centrifuging or filtration, are not well adapted to handling hot acids. I therefore prefer to break the emulsion in the following manner.

The valve K leading into the condenser is closed, leaving all other vents closed as they were during the digestion, and steam is admitted to the coil Q through the valve P. The steam generated by the boiling of the acid raises a pressure which increases as the temperature of the charge rises, and heating is continued until the temperature rises to at least 325° F. and preferably to 350° or 360° F. At the latter temperature the pressure in the digester will be from 90 to 100 pounds gauge. The temperature may be controlled by observing the thermometer B' and the pressure observed on the steam gauge A'. The exact temperature required to break the emulsion from any given proportion of the various materials charged can be learned only by cutting off the heat from time to time, on a trial batch, and observing by means of the try-cocks T, the lowest temperature at which a sufficiently rapid break is obtained. The figures given are illustrative only and I do not limit my invention to the temperature range stated. The pressure is incidental to the temperature, that is it is the vapor pressure of the acid solution at whatever temperature is carried, and has no function except to enable a higher temperature than the normal-pressure boiling point to be used.

If the operation up to this point has been properly controlled as to proportioning of charge, digestion time and final temperature, the separation of the emulsion should be so rapid that the drawing out of the separated liquids can be started as soon as the final temperature is reached. The pressure on the digester must not be released, as if this is done the acid will boil up and re-emulsify the separate layers. The cock Y should be opened part way and a small stream of hot acid forced out by the pressure of steam above the charge, into an acid storage tank. Too large a stream must not be drawn or the reduction in volume inside the digester will cause the acid to boil up. If a steam inlet pipe as indicated at C' is provided and steam under pressure admitted through the valve D' in sufficient quantity to maintain the pressure constant, the drawing of acid may be conducted more rapidly.

When the test cocks T show that the upper surface of the acid is close to the lower end of the pipe X, the valve Y is closed and the valve Z' in the line Z is opened carefully. The oily contents of the digester are thus discharged to whatever receiving or storage tank may be provided. When steam begins to blow through this pipe the oil is all out; the cock Z' is then closed and the condenser valve K is opened, releasing the pressure and leaving the digester ready for a new charge. The top steam valve D' is closed at this time.

The layer of liquid lying between the lower ends of the two pipes X and Z will consist, in part at least, of unbroken emulsion, and will also contain free carbon if any such exists in the sludge being treated. The emulsion in this layer will mix with the next batch and be partly broken down therewith, so that its quantity will not increase from one treatment to the next, but the carbon will continue to collect and must from time to time be removed through the end manhole E or the drain pipe D.

The acid solution drawn through the pipe Z may be lighter or heavier than the acid originally charged, according to the amount of steam used, but if this open steam is held to a minimum and the sludge contains only the normal proportion of water the final acid will be heavier than that originally charged. This is advantageous so far as the quantity removed is concerned, but the quantity left behind to start the next charge should be diluted back to its original strength by the addition of water through the manhole F or otherwise, to prevent a constant accretion of strength which would ultimately carry it past the 50° strength which is permissible.

The acid thus recovered will be found to be substantially free both from suspended solids and from dissolved organic matter (though it will usually, on prolonged standing, separate a little oil which may be skimmed off) and may readily be concentrated to a strength suitable for refinery use.

The oily layer discharged through the pipe X will be substantially free from acidity and from water, if the operation as described is conducted with care. It is a black oil having usually a rather high viscosity, though this varies with the nature of the sludge and with the quantity of solvent oil added and is thus under complete control. This oil is suitable for use as fuel as it will not choke nor corrode pipes or burners. It may also be reduced by distillation to an excellent grade of asphalt, but its distillates are highly unsaturated and are not suitable for further refining.

I call attention to the advantages attending the various steps in my method invention, for the purpose of clearly distinguishing such steps from somewhat similar processes which have heretofore been used or proposed.

The first stage in my invention consists in digesting the sludge at normal pressure with acid sufficiently dense to float the sludge (this being from 20° Bé. up to perhaps 50° Bé.), and preferably with the addition of a solvent for the liberated asphalt and hydrocarbons, the object of this step being to dissociate the acid-hydrocarbon compounds, drive off the gases produced during this reaction, and where solvent oil is used, to bring the liberated asphalt and oils into solution. This operation is clearly distinguished from processes bearing a superficial resemblance to it, in which the sludge is cooked with steam, or with steam, a very weak acid and gas oil, in the following particulars.

I specify that the acid in the original charge shall be of sufficient density to float the sludge prior to digestion. If the sludge is heated in contact with steam coils or hot plates, which will be the case if water or a weak acid be used, it will be locally overheated and a change is set up by which portions of the acid-hydrocarbon bodies are decomposed, with the formation of large quantities of sulfur dioxid and free carbon. The former is produced at the expense of the sulfuric acid and materially reduces the yield, the latter passes into the oil product to contaminate it and reduce its value. If the sludge is cooked with open steam, even though water be present above the sludge, the direct contact between steam and sludge brings about some decomposition of the latter, and produces very fine and obstinate emulsions. Again, the heavy and semi-solid mass of sludge, once attached to the metal shell, is dislodged only with great difficulty, and the melting of the charge consumes great quantities of steam, of which the latent heat is entirely lost, and the recovered acid is unduly diluted. Further, where the sludge is cooked with open steam or water in an open digester, the maximum temperature is obviously limited to the boiling point of water. Per contra, my method of digestion with a large volume of relatively strong acid keeps the sludge away from the shell or coils, provides a body of hot aqueous liquid which rolls through the sludge mass and heats every portion of it gently and equally, permits the use of a temperature (the boiling point of the acid solution) sufficiently high to accomplish the hydrolysis without pressure, and makes it possible to safely heat with coil steam only, thus utilizing the latent heat of the steam and preventing dilution of the acid. And finally, the emulsions obtained on rolling a large volume of acid solution with the sludge are much less obstinate and persistent, and thus separate more rapidly and completely.

The second stage in my method invention consists in breaking the emulsion formed in the first stage by the application of heat and pressure, and thus superficially resembles those processes in which hydrolysis of the raw sludge is accomplished by the same means. In the latter processes the sludge is introduced into the digester with only the small quantity of water permissible for forming a strong acid solution on taking up the acid produced by hydrolysis, and the charge is melted and cooked under the same conditions existing during the open cooking of sludge with water. In these processes the drawbacks are the same as those pointed out above, that is, during the melting stage the sludge will burn on heated surfaces, (coils or sheets) or by the direct steam if such is used, acid and oil are lost and contaminated, the operation is very slow and wasteful of fuel, and the emulsions formed break only with great difficulty and after prolonged "soaking" of the batch. Per contra, I apply high temperature only to a completely liquid mass, which has already had its acid compounds split and has been brought to a state of chemical stability, and I am thus enabled to separate the desired products much more rapidly and economically and with substantially no losses.

Further, the relatively small amount of sulfur dioxid and other acid gases evolved in the application of my invention is given off under conditions of low temperature and no pressure, under which conditions such gases are without effect on the lining of the digester, while in hydrolyzing the raw sludge at high temperature and pressure these gases are evolved and contacted with the shell under the conditions which render them most destructive to the linings, necessitating frequent and expensive repairs.

I do not claim the digestion of sludge with steam, nor with water, nor with highly dilute acid, nor with any of these bodies in the presence of a solvent oil, as such methods are old in the art and do not produce the results at which I aim. Nor do I claim the hydrolysis of raw sludge under heat and pressure in the presence of water, as such method has heretofore been used and does not produce the results attainable by the application of my method invention. What I have invented and wish to claim as broadly as the state of the art will permit, is set forth and limited solely by the attached claims.

I claim as my invention:

1. The method of separating acid sludge into useful constituents which comprises: digesting acid sludge with a solvent oil and dilute sulfuric acid, said acid having initially a density greater than that of the sludge.

2. The method of separating acid sludge into useful constituents which comprises: digesting said sludge with boiling dilute sulfuric acid at atmospheric pressure, said acid having initially a density greater than that of the sludge, continuing the digestion until emulsification takes place, and separating the emulsion so formed into an oily fraction and a dilute acid fraction.

3. A method as in claim 2 in which digestion is continued until sulfur dioxid is no longer evolved from the digesting mass.

4. A method as in claim 2 in which the separation of the emulsion into fractions is brought about by heating the emulsion to a temperature substantially above the normal-pressure boiling point of the dilute acid constituent in a substantially closed vessel.

5. A method as in claim 2 in which a solvent oil is admixed with the sludge and digested therewith.

6. A method as in claim 2 in which a solvent oil is admixed with the sludge and digested therewith and in which digestion is continued until sulfur dioxid is no longer evolved from the digesting mass.

7. A method as in claim 2 in which a solvent oil is admixed with the sludge and digested therewith and in which the separation of the emulsion into fractions is brought about by heating the emulsion to a temperature substantially above the normal-pressure boiling point of the dilute acid constituent, in a substantially closed vessel.

8. A method as in claim 2 in which the separation of the emulsion into fractions is brought about by heating the emulsion to a temperature substantially above the normal-pressure boiling point of the dilute acid constituent in a substantially closed vessel and the fractions thus separated are separately withdrawn from the vessel without substantial reduction of the pressure therein.

9. A method as in claim 2 in which the sludge is admixed with a solvent oil and digested therewith and in which the separation of the emulsion into fractions is brought about by heating the emulsion to a temperature substantially above the normal-pressure boiling point of the dilute acid constituent in a substantially closed vessel and the fractions thus separated are separately withdrawn from the vessel without substantial reduction of the pressure therein.

In witness that I claim the foregoing I have hereunto subscribed my name this 5 day of April, 1927.

ERNEST W. ROTH.